United States Patent Office 3,652,597
Patented Mar. 28, 1972

3,652,597
PRODUCTION OF DI-HYDROXY PRODUCTS
Henry Bader and Edwin G. Jahngen, Jr., Newton Center, Mass., assignors to Polaroid Corporation, Cambridge, Mass.
No Drawing. Filed Mar. 2, 1970, Ser. No. 15,965
Int. Cl. C07d 7/26, 39/08
U.S. Cl. 260—343.2 R
13 Claims

ABSTRACT OF THE DISCLOSURE

Di-hydroxy products of monohydric phenol compounds are prepared by persulfate oxidation in the presence of ethylenediaminetetraacetic acid and an olefinic free radical trap.

---

This invention relates to improved chemical processes, and, more particularly, to improved processes of preparing para-hydroxy products of phenol and substituted phenols including the related coumarins by persulfate oxidation.

The oxidation of phenols to hydroquinones with persulfates in alkaline medium was discovered by Elbs in 1893, who reported that o-nitrophenol treated with persulfate in alkaline solution yielded nitroquinol after subsequent acidification of the reaction mixture. This reaction has since been extended to various other materials and is commonly referred to as the Elbs persulfate oxidation reaction.

With phenols where the position para to the hydroxy group is free of substituents, para-hydroxy, i.e., quinol derivatives, are formed. Where the para position is substituted, the reaction takes place at the ortho position. When more than one hydroxy group is present in the starting material, as in polyhydric phenols, usually all but one of the hydroxy groups are methylated in order to protect the molecule from general oxidation.

The ionic mechanism for this reaction is well accepted, with a preponderance of evidence suggesting an original attack of the persulfate ion on the phenolic oxygen, followed by an inter- or intra-molecular rearrangement. The sulfate ester formed as an intermediate of the reaction is then hydrolyzed by acid to give the dihydroxy-substituted product. Presumably, the reaction proceeds according to the following:

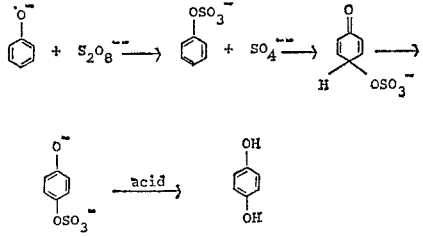

A study of the mechanism involved in this reaction was published by Berman and Walker, J. Amer. Chem. Soc., 84, 3454 (1962).

As discussed by these authors and by S. M. Sethna, Chem. Revs. 49, 91 (1951), this oxidation reaction is usually accompanied by homolysis of the persulfate to sulfate radicals which generate hydroxy radicals. Formation of phenyl radicals by the latter leads to dimerization and polymerization of the phenol, presumably according to the following scheme:

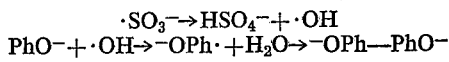

Though the Elbs persulfate oxidation reaction offers a convenient way in which to introduce a hydroxy group, product yields generally are low, and frequently, the product is difficult to isolate. Due to the side reaction discussed above, the crude material tends to contain large quantities of polymeric by-products. Recovering the pure material from the crude tar or resin is very difficult unless the content of the desired product is quite high.

It is therefore the main object of the present invention to provide an improved method of oxidizing monohydric phenol compounds to the corresponding para-di-hydroxy compounds via persulfate oxidation in alkali.

It is another object of this invention to render the Elbs persulfate oxdiation reaction a practical method of producing para-hydroxy products of monohydric phenol compounds in high purity and in improved yields.

It is a further object of this invention to provide an improved process of preparing intermediates useful in the production of compounds that find utility in photographic compositions.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

According to the present invention, it has now been discovered quite unexpectedly that para-hydroxy products of monohydric phenol compounds may be produced in improved yields and in higher purity by conducting the Elbs persulfate oxidation reaction in the presence of ethylenediaminetetraacetic acid (EDTA) together with an olefinic free radical trap. Preferably, ammonium persulfate is employed as the oxidizing agent.

By conducting the oxidation reaction in this manner, the para-di-hydroxy product may be obtained in actual yields generally exceeding 30% by weight as a crude material of consistently high purity, usually about 90% or more before being recrystallized or purified in some other way. Moreover, the purification of the mono-sulfate intermediate from the tarry reaction by-products is greatly facilitated by the further discovery that a cleaner and more efficient extraction of tars may be achieved by acidifying the reaction mixture to pH 1 rather than the customary pH 3, prior to the extraction.

In comparison with the prior art, such results represent a significant improvement. As carried out in the past, the Elbs oxidation of monohydric phenols and internal esters thereof, e.g., coumarins, gave comparatively low yields. The oxidation of dihydrocoumarin gave 10% by weight yield of 6-hydroxy-dihydrocoumarin as reported by G. Bargellini and L. Monti, Gazz. chim. ital., 45, I, 90 (1915). With 7,8-dimethoxydihydrocoumarin, the corresponding 6-hydroxy product was formed in an 18% by weight yield as reported by F. Wessely and E. Demmer, Ber. 62, 120 (1929). A generally accepted operating procedure for the Elbs oxidation reaction was described by W. Baker and N. C. Brown, J. Chem. Soc., 1948, 2303, who obtained a 25% by weight yield of gentisaldehyde from salicylaldehyde. Repetition of the standard procedure of Baker and Brown with o-phenylphenol using potassium persulfate as the oxidizing agent and an "overnight" reaction time gave a 13% by weight yield of phenylhydroquinone in a resin in a 46% by weight content.

As indicated above, the method of the present invention represents an improved and practical procedure for carrying out the Elbs persulfate oxidation reaction for introducing a hydroxy group into the para position of monohydric phenol compounds. Any monohydric phenol compound may be used provided it has a free para position including phenol itself, substituted monohydric phenols and ring closed internal esters of ortho-substituted monohydric phenols, such as coumarins and dihydrocumarins that undergo ring opening in alkali to form a hydroxy group. With these latter compounds, the α-pyrone ring opens in alkali and oxidation takes place in the 6-position of the original coumarin, which position is para to the hydroxy group formed when the ring opens. The ring is again formed during subsequent acidification of the reaction mixture.

Illustrative of the starting materials that may be used in the present invention are those represented by the formula:

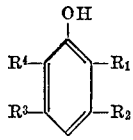

wherein $R^1$ is hydrogen, alkyl, cycloalkyl, alkenyl, aryl, aralkyl, alkoxy, aryloxy, acetyl, nitro, chloro, bromo, carboxyl, aldehyde, carboxyalkyl and ring closed esters derived therefrom and carboxyalkenyl and ring closed esters derived therefrom; and $R^2$, $R^3$ and $R^4$ each are selected from hydrogen, alkyl, cycloalkyl, alkenyl, aryl, aralkyl, alkoxy, aryloxy, acetyl, nitro, chloro, bromo, carboxyl and aldehyde.

Typical of the above substituents $R^1$, $R^2$, $R^3$ and $R^4$ are methyl, ethyl, butyl, hexyl, ethenyl, propenyl, hexenyl, cyclopentyl, cyclohexyl, phenyl, naphthyl, benzyl, phenethyl, methoxy, ethoxy, propoxy, phenoxy, benzyloxy, 2-carboxyethyl, 1-methyl-2-carboxyethenyl and 2-carboxyethenyl.

Examples of compounds that may be used as starting materials in the present method are phenol, o-nitrophenol, o-cresol, 2-methyl-5-nitrophenol, 2,5-xylenol, m-hydroxybenzaldehyde, salicylaldehyde, o-chlorophenol, o-bromophenol, 2,6-dibromophenol, o-hydroxybenzoic acid, 2,3-dimethoxyphenol, m-cresol, 2,3-xylenol, 3,5-xylenol, 3,5-dichlorophenol, m-hydroxybenzoic acid, 2-hydroxy-2-methoxybenzaldehyde,
2-hydroxy-4-methoxybenzaldehyde,
5-hydroxy-4-ethoxybenzaldehyde,
2-hydroxy-3-methoxyacetophenone,
2-hydroxy-6-methoxyacetophenone,
2-hydroxy-6-benzyloxyacetophenone,
2-hydroxy-3,4-ethoxyacetophenone,
2-hydroxy-3,4,6-trimethoxyacetophenone,
2-hydroxy-4-methoxybenzoic acid,
5-hydroxy-4-methoxybenzoic acid,
2-hydroxy-3,4-dimethoxybenzoic acid,
2-hydroxy-cinnamic acid,
2-hydroxy-6-phenoxyacetophenone,
o-cyclohexylphenol,
o-phenylphenol,
o-benzylphenol,
o-vinylphenol,
m-allylphenol,
2-hydroxyhydrocinnamic acid,
coumarin,
7-methoxycoumarin,
7,8-dimethoxycoumarin,
7-methoxy-8-ethoxycoumarin,
8-methoxycoumarin,
4-methylcoumarin,
7-methoxy-4-methylcoumarin,
5-methoxy-4,7-dimethylcoumarin,
5,7-dimethoxy-4-methylcoumarin,
dihydrocoumarin,
5,7-dimethyl dihydrocoumarin, and
7,8-dimethoxy dihydrocoumarin.

In carrying out the present method, an aqueous persulfate solution is added to an aqueous alkaline solution comprising monohydric phenol compound, EDTA and an olefinic free radical trap. After oxidation is complete, the reaction mixture is acidified, preferably to pH 1, and extracted with organic solvent to remove by-products of the reaction. The ester intermediate is then hydrolyzed with acid to give the para-hydroxy product of the phenol starting material.

Though prior investigators have indicated that potassium persulfate is, in general, a more reliable oxidizing agent than ammonium persulfate and that no significant advantage is gained by using ammonium instead of potassium persulfate, we have not experienced any difficulty in using the ammonium salt and actually have found its use to be advantageous. The more soluble ammonium salt allows reaction mixtures 2½ times more concentrated and reaction times may be reduced from the conventional "overnight" period to a few hours, resulting in an immediate improvement in product yield and product purity. For example, the yield of phenylhydroquinone was increased from 13 to 26% by weight and the purity of the crude product from 46 to 93% by weight by using ammonium persulfate and a reaction time of two hours instead of potassium persulfate and reacting "overnight".

Further improvements are achieved by carrying out the oxidation in the presence of EDTA employed in the reaction mixture in an amount of at least 0.10 mole percent, and ordinarily, in an amount between 0.10 and 2.0 mole percent based on phenol. At 0.17 mole percent of EDTA, the yield of phenylhydroquinone was increased to over 30% by weight.

Still further increases in yield are obtained by using an olefinic free radical trap in conjunction with the EDTA. Olefinic free radical traps are well-known to those skilled in the art and any of the olefinic traps commonly employed may be used in the percent method, e.g., allyl alcohol, cyclohexadiene and allylbenzene. Optimum effectiveness in increasing yield is achieved at a level of about 5 to 20 mole percent of the olefinic trap. The concentration of starting phenol compound and the proportions of alkali and persulfate may vary widely. Ordinarily, the starting phenol is used in amounts between about 1 and 7 grams per 100 ml. of water. Though yields and purity of product improve somewhat with decreasing concentrations, for practical purposes, it is preferred to maintain the concentration of phenol between about 4 and 7 grams per 100 ml. of water. Above about 7 grams, yields tend to decrease.

The quantity of ammonium persulfate may range between about 0.5 and 3.0 moles per mole of phenol. The quantity of alkali used is usually between about 5 to 15 moles per mole of phenol. Though a greater excess of alkali may be used without any sacrifice in product yield, the end product becomes increasingly difficult to isolate from the by-products of the reaction. As the alkali, any base such as potassium or other alkali or alkaline earth metal hydroxide may be used, but sodium hydroxide is preferred.

Although the rate of the Elbs persulfate reaction itself increases with the temperature, the yields of the desired product suffer at high temperatures. To preserve yields, the reaction is carried out at a temperature between about 0° C. and 50° C. and preferably between about 0° and 20° C. At these temperatures, the reaction is complete within a comparatively short time, usually within 1 to 2 hours at 20° C. and above, and within 3 to 4 hours at lower temperatures. While it is not essential, the persulfate-oxidation is preferably conducted in an inert atmosphere.

Conventionally, the aqueous reaction mixture containing the mono-sulfate intermediate is acidified to pH 3; the tarry by-products are extracted from the aqueous medium using an appropriate organic solvent; and the aqueous medium is further acidified to hydrolyze the ester intermediate after which the p-di-hydroxy end product is extracted with an organic solvent. With o-phenylphenol, under these conditions, at the end of the hydrolysis a black tar containing some product had to be discarded. Extraction of the aqueous phase afforded a black solid which contained 75% of the total product formed. Thus, not only 25% of the product was lost, but the separation of the tar was tedious and the quality of the recovered product was poor.

It was found that product loss after hydrolysis could be reduced and substantially eliminated by extracting the tarry by-products at a pH of 1 rather than a pH of 3. By removing the impurities at a lower pH before hydrolyzing the ester intermediate, little if any tar remained after hydrolysis so that the entire product could be isolated. Also, it was found that conducting the hydrolysis step in an inert atmosphere prevented small losses of product that had occurred when the intermediate had been hydrolyzed in air according to conventional procedures. Thus, by modifying the isolation procedure in the above manner, product can be recovered in substantially the same yield as originally contained in the crude reaction mixture.

It will be appreciated by those skilled in the art that any appropriate water-immiscible organic solvent as customarily employed in solvent extraction techniques may be used in the purification and isolation of the product, e.g., methylene chloride, ether, chloroform and benzene. Likewise, any strong organic or inorganic acid such as hydrochloric and sulfuric acids may be employed for adjusting the pH and for hydrolyzing the ester intermediate and nitrogen, argon or other inert atmosphere may be be used in the hydrolysis step.

The following examples are given to further illustrate the present invention and are not intended to limit the scope thereof.

EXAMPLE 1

Preparation of phenylhydroquinone

To a stirred solution of 17.0 g. (0.1 mole) of o-phenylphenol, 0.5 g. (0.0017 mole) of EDTA, 34.0 g. (0.85 mole) of sodium hydroxide and 2.4 g. (0.020 mole) of allylbenzene in 180 ml. of distilled water, kept under nitrogen atmosphere and cooled to 5° C., a solution of 22.8 g. (0.1 mole) of ammonium persulfate in 100 ml. of distilled water was added dropwise, over a period of 1 hour. The resulting solution was kept at 5° C. for an additional 4 hours. Then, 100 ml. of methylene chloride was added and the mixture was acidified with 2 N hydrochloric acid solution to pH 1.0. A small amount of tar was filtered over glass wool and well washed with water. The filtrate was extracted with methylene chloride, after which 25 ml. of concentrated hydrochloric acid was added and the resulting solution was heated on the steam bath for 1 hour, under an atmosphere of nitrogen. After cooling to room temperature, the solution was extracted with 4× 150 ml. of methylene chloride. The methylene chloride was removed from the solvent phase on a rotor-evaporator, leaving a residue which crystallized on cooling to room temperature. The brown product weighed 7.9 g. and had a purity of 95.0% by weight which corresponded to an actual yield of 40.4% by weight of theoretical.

To illustrate the improvements achieved by the present method of using EDTA together with an olefinic free radical trap, two additional reactions were conducted in the same manner except for the following variations.

(a) The reaction was carried out in the absence of EDTA and allylbenzene.

(b) The reaction was carried out in the presence of EDTA but without allylbenzene.

Product yields for reactions (a) and (b) were 26% by weight and 30.9% by weight, respectively, as compared to 40.4% by weight for Example 1 above.

EXAMPLE 2

Example 1 was repeated at room temperature (20° C.) employing a 2-hour reaction time, 0.17 mole percent EDTA and 20 mole percent of allyl alcohol. Product yield was 30.9% by weight.

EXAMPLE 3

Example 2 was repeated except that 20 mole percent of cyclohexadiene was substituted for the allyl alcohol. Product yield was 36.1% by weight.

EXAMPLE 4

Example 2 was repeated except that 20 mole percent of allylbenzene was substituted for the allyl alcohol. Product yield was 37.6% by weight.

EXAMPLE 5

Preparation of 6-hydroxydihydrocoumarin

To a solution of 7.4 g. (0.05 mole) of dihydrocoumarin in 90 ml. of distilled water was added 17.0 g. (0.425 mole) sodium hydroxide, 0.5 ml. (0.0043 mole) allylbenzene, and 0.1 g. (0.00034 mole) EDTA, under nitrogen. This solution was kept below 5° C. and 18.7 g. (0.083 mole) of ammonium persulfate in 50 ml. of distilled water was added over a period of approximately 45 minutes. The reaction mixture was warmed to 20° C. and maintained at this temperature for 2 hours.

The reaction mixture was acidified to a pH of 1 with 2 N hydrochloric acid and then filtered through glass wool. The filter was well washed with water, and the filtrate extracted with 600 ml. of methylene chloride. The aqueous phase was hydrolyzed on a steam bath for one hour under nitrogen and then extracted continuously for 24 hours with methylene chloride. The methylene chloride was evaporated from the solvent phase and the residue comprising the product dried.

The product was isolated as a solid and an oil. The solid was all lactone (1.3 g.; 100% pure by v.p.c.) and the oil was 46% lactone (1.98 g.) and 24% the acid (1.04 g.) (e.g., 70% content of the desired products) which corresponds to an actual yield of 52.7% by weight of theoretical.

EXAMPLE 6

Preparation of gentisaldehyde

To a solution of 12.2 g. (0.10 mole) salicylaldehyde in 180 ml. of distilled water was added 34.0 g. (0.85 mole) of sodium hydroxide, 1.0 ml. (0.0076 mole) allylbenzene, and 0.2 g. (0.00068 mole) of EDTA, under nitrogen. This solution was kept below 5° C. until the addition of 37.4 g. (0.166 mole) ammonium persulfate in 100 ml. of distilled water was complete (approximately 45 minutes). The reaction mixture was then warmed and kept at 20° C. for 2 hours.

The reaction mixture was acidified to a pH of 1 with 2 N hydrochloric acid, and filtered through glass wool. The filter was well washed with water, and the filtrate extracted with 1600 ml. of methylene chloride. The aqueous phase was hydrolyzed on a steam bath for 1 hour under nitrogen and then extracted with 1.5 liter of methylene chloride and 1 liter of ether. The solvent was evaporated from each of the organic extracts leaving 4.1 g. of product from the methylene chloride as a yellow solid, melting range 84–86° C., and 1.4 g. of product from the ether as a dark solid, melting range 83–88° C. A v.p.c. analysis of the combined material indicated at 95.0% purity. The actual yield was 36% by weight of theoretical (cf., 25% yield claimed by Baker and Brown, loc. cit.).

From the above examples, it is readily apparent that the method of the present invention renders the Elbs reaction practical for producing p-hydroxy product of monohydric phenol compounds. Yields are at least 50% greater than previously obtained and the purity of the crude product high enough to allow separation of pure material with ease and with little or no product loss.

The compounds produced in accordance with the present invention, as indicated above, are useful as intermediates in the synthesis of other compounds finding utility in photographic processes, products and compositions. For example, the compounds of the present invention may be reacted with an appropriate radical to form a ligand containing a silver halide developing function such as those described and claimed in copending application Ser. No. 881,323 of E. M. Idelson filed Dec. 1, 1969, which application is a continuation-in-part of his copending application Ser. No. 487,054, filed Sept. 13, 1965 and now abandoned. Besides being useful as photographic developing agents, these ligands having a developing function may be used as intermediates in the preparation of metallized dyes employed in photographic products, processes and compositions. Such dyes and the preparation thereof from the above-mentioned developer-ligands are described and claimed in copending application Ser. No. 804,315 of E. M. Idelson filed Mar. 4, 1969 now U.S. Pat. No. 3,551,406 issued Dec. 29, 1970, which application is a continuation-in-part of his copending application Ser. No. 487,033 filed Sept. 13, 1965 now abandoned.

Since certain changes may be made in the above method without departing from the scope of the invention herein involved, it is intended that all matter contained in the above description shall be interpreted as illustrative and not in a limiting sense.

What is claimed is:

1. In the process of oxidizing a compound which is a monohydric phenol in alkali having a free para position to its corresponding p-hydroxy product which comprises the steps of:
   (a) reacting said compound in an aqueous solution of alkali with ammonium persulfate at a temperature between 0° and 50° C. to form a monosulfate ester intermediate;
   (b) extracting the resulting reaction mixture with organic solvent;
   (c) hydrolyzing said ester intermediate to the p-hydroxy product by acidifying and heating said reaction mixture under an inert atmosphere; and
   (d) isolating the p-hydroxy product, the improvement which comprises conducting said reaction of said compound with ammonium persulfate in the presence of at least 0.01 mole percent of ethylene diaminetetraacetic acid and about 5 to 20 mole percent of an olefinic free radical trap.

2. The process of claim 1 wherein the reaction mixture is extracted with organic solvent at pH 1.

3. The process of claim 1 wherein said olefinic free radical trap is allylbenzene.

4. The process of claim 1 wherein said olefinic free radical trap is allyl alcohol.

5. The process of claim 1 wherein said olefinic free radical trap is cyclohexadiene.

6. The process of claim 1 wherein said ethylenediaminetetraacetic acid is present in an amount between 0.1 and 2.0 mole percent.

7. The process of claim 1 wherein the temperature is between 0° and 20° C.

8. The process of claim 1 wherein the concentration of ammonion persulfate is between 0.5 and 3.0 moles per mole of said compound and the concentration of alkali is between about 5 and 15 moles per mole of said compound.

9. The process of claim 8 wherein said alkali is sodium hydroxide.

10. The process of claim 1 wherein said compound is o-phenylphenol.

11. The process of claim 1 wherein said compound is dihydrocoumarin.

12. The process of claim 1 wherein said compound is salicylaldehyde.

13. The process of claim 1 wherein the concentration of said compound is between 1 and 7 grams per 100 ml. of water.

References Cited

Berman et al., J. Amer. Chem. Soc., vol. 84, pp. 3454–7 (1962).

JOHN M. FORD, Primary Examiner

U.S. Cl. X.R.

260—600, 620, 621 G